United States Patent
Unger et al.

(10) Patent No.: US 8,571,182 B2
(45) Date of Patent: Oct. 29, 2013

(54) SYSTEMS AND METHODS OF MASKING NON-SERVICE AFFECTING ALARMS IN A COMMUNICATION SYSTEM

(75) Inventors: Stephen John Unger, Allen, TX (US); Nimer Ibrahim Yaseen, Allen, TX (US); Nitin Gogate, Montvale, NJ (US)

(73) Assignee: Fujitsu Limited, Kawasaki-shi (JP)

( * ) Notice: Subject to any disclaimer, the term of this patent is extended or adjusted under 35 U.S.C. 154(b) by 379 days.

(21) Appl. No.: 12/887,657

(22) Filed: Sep. 22, 2010

(65) Prior Publication Data
US 2012/0069970 A1    Mar. 22, 2012

(51) Int. Cl.
H04M 1/24 (2006.01)
H04M 3/08 (2006.01)
H04M 3/22 (2006.01)
H04M 7/00 (2006.01)

(52) U.S. Cl.
USPC ..................................... 379/9.02; 379/221.03

(58) Field of Classification Search
USPC ........... 379/9.02–9.04, 32.01, 221.03, 221.04
See application file for complete search history.

(56) References Cited

U.S. PATENT DOCUMENTS

| 5,946,373 A * | 8/1999 | Harris ........................ 379/14.01 |
| 7,318,178 B2 * | 1/2008 | Steinberg et al. ............ 714/47.2 |
| 7,433,450 B2 * | 10/2008 | Burns et al. ...................... 379/9 |

* cited by examiner

Primary Examiner — Quoc D Tran
(74) Attorney, Agent, or Firm — Baker Botts L.L.P.

(57) ABSTRACT

According to one embodiment, a method may include detecting existence of an alarm-triggering event associated with a service at a maintenance level. The method may also include analyzing one or more parameters associated with carrier traffic for the service. The method may additionally include determining whether a data path for carrier traffic associated with the service is operational based on the analysis of the one or more parameters. The method may further include masking or downgrading an alarm triggered by the alarm-triggering event in response to a determination that the data path is operational.

20 Claims, 3 Drawing Sheets

SYSTEMS AND METHODS OF MASKING NON-SERVICE AFFECTING ALARMS IN A COMMUNICATION SYSTEM

TECHNICAL FIELD

This disclosure relates generally to the field of communications systems and more specifically to configuring a network element to mask non-service affecting alarms.

BACKGROUND

A communication network may include network elements that route packets through the network. Some network elements may include a distributed architecture, wherein packet processing may be distributed among several subsystems of the network element (e.g., line cards).

Service Operation, Administration, and Management ("Service OAM" or "SOAM"), is defined by IEEE 802.1ag and defines Maintenance Entity Group End Points (MEPs) that may be provisioned on a network element. A MEP may be associated with a particular maintenance level (e.g., 0 to 7) and may be configured to communicate traffic, for example continuity check messages (CCMs), to a peer MEP at the same maintenance level that resides in the communication network. CCMs may be periodically communicated between MEPs at the same maintenance level, and a service is considered down if a MEP does not receive a CCM from its peer MEP within a certain time.

Often, in response to a failure to detect the CCM from a peer MEP within a certain time, a MEP may issue an alarm. Such an alarm may indicate a connectivity problem, and thus may trigger any number of responses, including, without limitation, redundancy protection (e.g., protection switching in accordance with the ITU G.8031 standard), reduction in traffic, or other response. Such alarms may be in accordance with the IEEE 802.1ag standard and/or the ITU Y.1731 standard.

However, instances exist in which an alarm message may be generated by a MEP despite the fact that a data path in the data plane for a service is still operational. For example, the following events may cause a SOAM alarm for a service (e.g., a Loss of Continuity, or "LOC" alarm), despite the fact that a data path for the service remains operational:

MEP software for a peer MEP restarts;
a peer MEP is provisioned with ADMINSTATE down;
a peer MEP level is mis-provisioned (e.g., provisioned with incorrect level);
a peer MEP is provisioned with an incorrect direction;
a peer MEP is provisioned on incorrect service;
a peer MEP Maintenance Entity Group name is mis-provisioned;
an intermediate MEP with incorrect higher MEP level exists;
a duplicate MEP exists;
a peer MEP has CCM disabled;
a peer MEP is not provisioned;
unmatched CCM intervals exists between peer MEPs; and
any other suitable event.

Traditionally, the SOAM standard makes no distinction between service-affecting alarms (alarms occurring in connection with an actual data path connectivity issue) and non-service affecting alarms (alarms that occur despite data path remaining operational). Such lack of distinction is often problematic, as such alarms may still trigger responses (whether automatic responses or manual human response by a network provider), and may thus hamper productivity and network performance.

SUMMARY OF THE DISCLOSURE

In accordance with the present disclosure, disadvantages and problems associated with the issuance of service affecting alarms may be reduced or eliminated.

According to one embodiment, a method may include detecting existence of an alarm-triggering event associated with a service at a maintenance level. The method may also include analyzing one or more parameters associated with carrier traffic for the service. The method may additionally include determining whether a data path for carrier traffic associated with the service is operational based on the analysis of the one or more parameters. The method may further include masking or downgrading an alarm triggered by the alarm-triggering event in response to a determination that the data path is operational.

Certain embodiments of the disclosure may provide one or more technical advantages. A technical advantage may be that SOAM alarms in a communication system may be correctly identified as service-affecting or non-service affecting, or masked.

Certain embodiments of the disclosure may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION OF THE DRAWINGS

Figure 1:
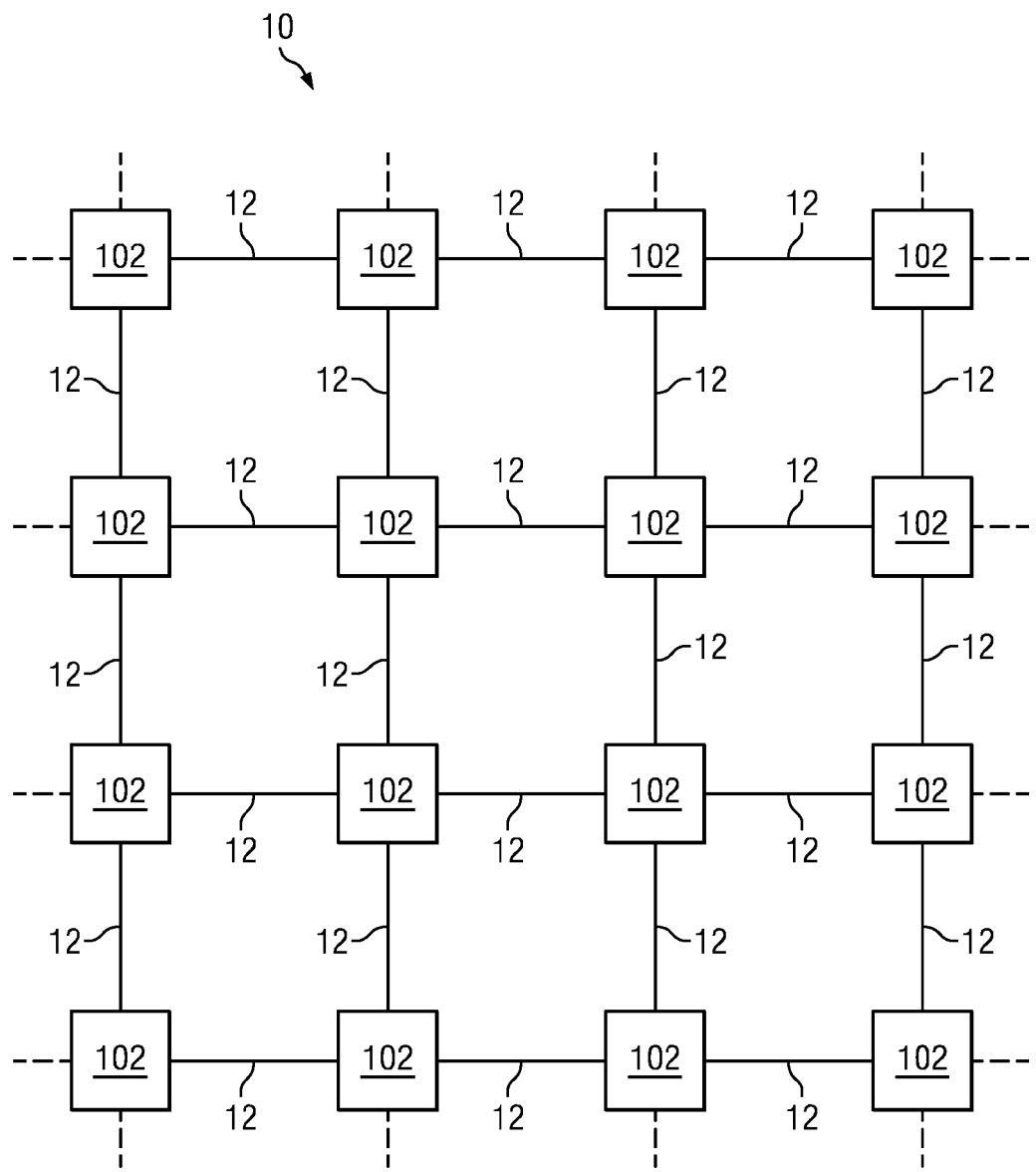
FIG. 1 illustrates a block diagram of an example communication network, in accordance with certain embodiments of the present disclosure.
Figure 2:
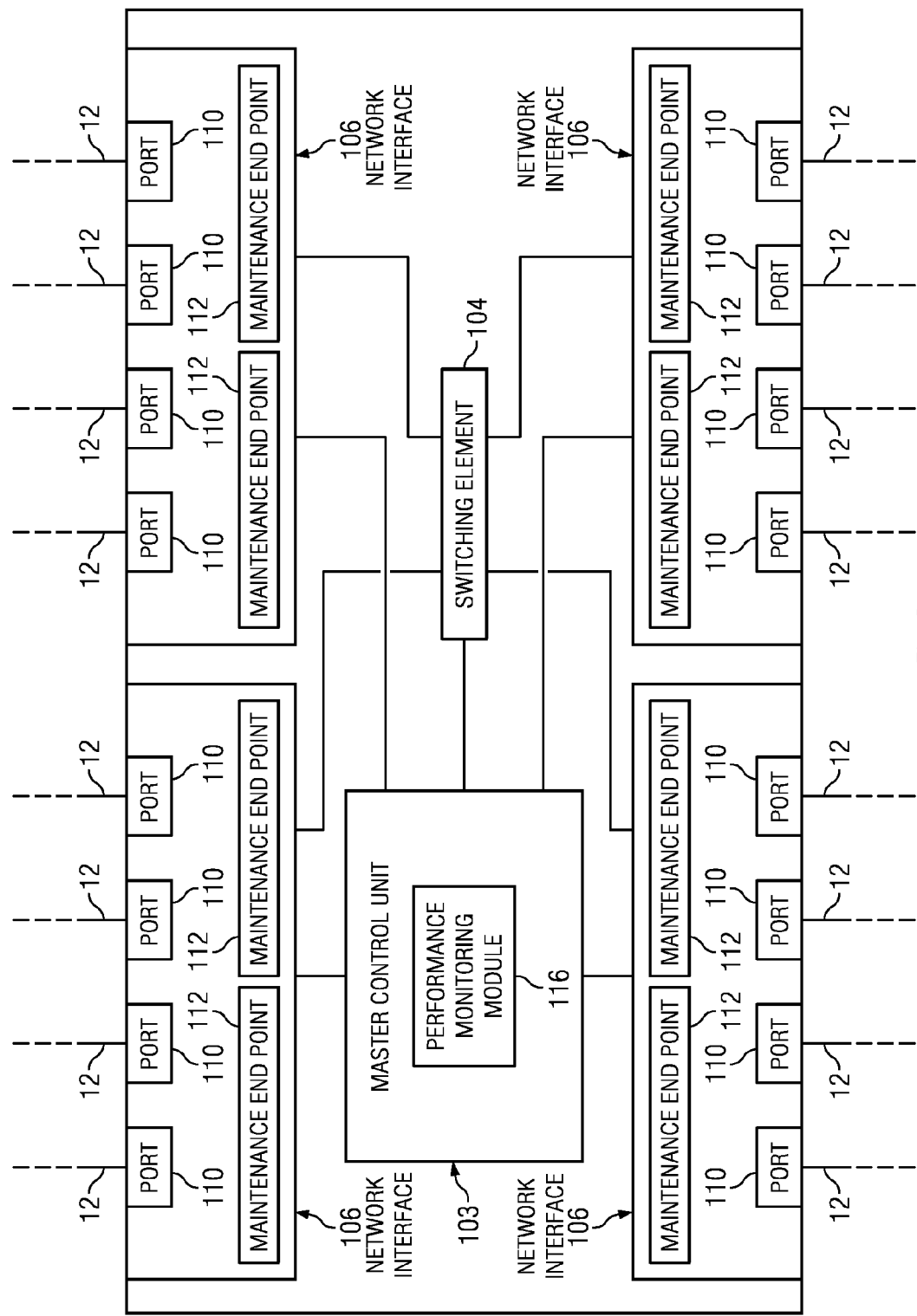
FIG. 2 illustrates a block diagram an example network element, in accordance with certain embodiments of the present disclosure.
Figure 3:
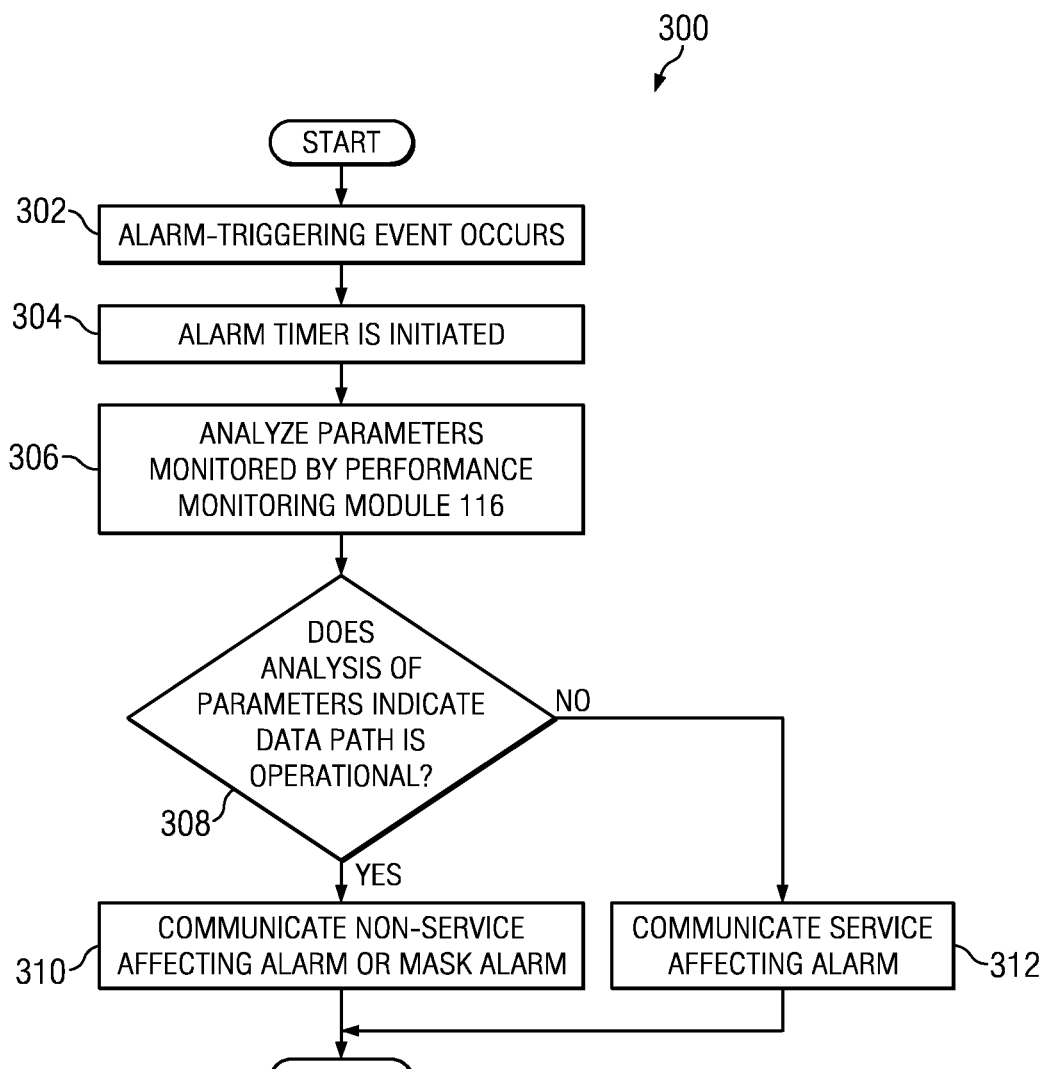
FIG. 3 illustrates a flow chart of an example method for masking or downgrading service affecting alarms, in accordance with certain embodiments of the present disclosure.

Embodiments of the present disclosure and its advantages are best understood by referring to FIGS. 1-3, like numerals being used for like and corresponding parts of the various drawings.

FIG. 1 illustrates a block diagram of an example network 10, in accordance with certain embodiments of the present disclosure. In certain embodiments, network 10 may be an Ethernet network. Network 10 may include one or more transmission media 12 operable to transport one or more signals communicated by components of network 10. The components of network 10, coupled together by transmission media 12, may include a plurality of network elements 102. In the illustrated network 10, each network element 102 is coupled to four other nodes. However, any suitable configuration of any suitable number of network elements 102 may create network 10. Although network 10 is shown as a mesh network, network 10 may also be configured as a ring network, a point-to-point network, or any other suitable network or combination of networks. Network 10 may be used in a short-haul metropolitan network, a long-haul inter-city network, or any other suitable network or combination of networks.

Each transmission medium 12 may include any system, device, or apparatus configured to communicatively couple network devices 102 to each other and communicate information between corresponding network devices 102. For example, a transmission medium 12 may include an optical fiber, an Ethernet cable, a T1 cable, a WiFi signal, a Bluetooth signal, or other suitable medium.

Network 10 may communicate information or "traffic" over transmission media 12. As used herein, "traffic" means information transmitted, stored, or sorted in network 10. Such traffic may comprise optical or electrical signals configured to encode audio, video, textual, and/or any other suitable data. The data may also be real-time or non-real-time. Traffic may be communicated via any suitable communications protocol, including, without limitation, the Open Systems Interconnection (OSI) standard and Internet Protocol (IP). Additionally, the traffic communicated in network 10 may be structured in any appropriate manner including, but not limited to, being structured in frames, packets, or an unstructured bit stream.

Each network element 102 in network 10 may comprise any suitable system operable to transmit and receive traffic. In the illustrated embodiment, each network element 102 may be operable to transmit traffic directly to one or more other network elements 102 and receive traffic directly from the one or more other network elements 102. Network elements 102 will be discussed in more detail below with respect to FIG. 2.

Modifications, additions, or omissions may be made to network 10 without departing from the scope of the disclosure. The components and elements of network 10 described may be integrated or separated according to particular needs. Moreover, the operations of network 10 may be performed by more, fewer, or other components.

FIG. 2 illustrates a block diagram an example network element 102, in accordance with certain embodiments of the present disclosure. As discussed above, each network element 102 may be coupled to one or more other network elements 102 via one or more transmission media 12. Each network element 102 may generally be configured to receive data from and/or transmit data to one or more other network elements 102. In certain embodiments, network element 102 may comprise a switch configured to route data received by network element 102 to another device (e.g., another network element 102) coupled to network element 102.

As depicted in FIG. 2, each network element 102 may include a master control unit 103, a switching element 104, and one or more network interfaces 106 communicatively coupled to each of master control unit 103 and switching element 104.

Master control unit 103 may include any suitable system, apparatus, or device configured to manage network element 102, including management of routing of data between ports 110. Master control unit 103 may maintain a routing table in accordance with open shortest path first (OSPF) protocol, intermediate system-intermediate system (ISIS) protocol, or any other suitable protocol, wherein such routing table may include any table, database, file, or other data structure configured to maintain information relating a particular ingress port 110 to a corresponding egress port 110. In addition, master control element 103 may be configured to detect the existence of and/or mask non-service affecting alarms, as described in greater detail below.

As shown in FIG. 2, master control unit 103 may include performance monitoring module 116. Performance monitoring module 116 include any system, device, or apparatus configured to monitor one or more parameters regarding traffic (carrier traffic, management traffic, or both) communicated to or from network element 102. For example, for carrier traffic, performance monitoring module 116 may monitor for the number of flow point packets (in FpPackets) received/transmitted for a service, the number of flow point bytes (in FpBytes) received/transmitted for a service, total frames received (TFR) for a service, and/or any other parameter indicative of communication of carrier traffic for a service to and/or from network element 102.

Switching element 104 may be communicatively coupled to master control unit 103 and may include any suitable system, apparatus, or device configured to receive traffic via a port 110 and route such traffic to a particular network interface 106 and/or port 110 based on analyzing the contents of the data and/or based on a characteristic of a signal carrying the data (e.g., a wavelength and/or modulation of the signal). For example, in certain embodiments, a switching element 104 may include a switch fabric (SWF).

Each network interface 106 may include any suitable system, apparatus, or device configured to serve as an interface between a network element 102 and a transmission medium 12. Each network interface 106 may enable its associated network element 102 to communicate to other network elements 102 using any suitable transmission protocol and/or standard. Network interface 106 and its various components may be implemented using hardware, software, or any combination thereof. For example, in certain embodiments, one or more network interfaces 106 may include a network interface card. In the same or alternative embodiments, one or more network interfaces 106 may include a line card.

As depicted in FIG. 2, each of network interfaces 106 may include one or more physical ports 110. Each physical port 110 may include any system, device or apparatus configured to serve as a physical interface between a corresponding transmission medium 12 and network interface 106. For example, a physical port 110 may comprise an Ethernet port, an optical port, or any other suitable port.

Also as shown in FIG. 2, each network interface 106 may have one or more maintenance end points 112 provisioned thereon. A maintenance end point 112 may include an end point of a group of network components associated with a particular maintenance level and may be configured to communicate management traffic, for example connectivity fault management (CFM) messages, to a peer maintenance end point 112 of the same maintenance level, as described in greater detail below. Such CFM messages may include heartbeat or hello messages (e.g., CCMs), loopback messages, linktrace messages, and alarm indication suppression messages. In certain embodiments, a maintenance end point 112 may include a Maintenance Entity Group End Point (MEP) in accordance with a SOAM standard (e.g., IEEE 802.1ag). Although network element 102 is depicted in FIG. 2 as having a particular number of maintenance end points 112, network element 102 may include any suitable number of maintenance end points 112. In some embodiments, network element 102 may include a plurality of maintenance end points 112 wherein at least two of such maintenance end points 112 are of a different maintenance level.

In addition, a maintenance end point 112 may be configured to transmit alarm messages in response to any suitable event, as described above. In some instances, such alarm messages may be transmitted in a network direction away from where its peer maintenance end point 112 is located (e.g., in an upstream direction). Examples of alarm messages may include Loss of Continuity (LOC) alarm, Mismerge alarm, Unexpected MEP (UMEP) alarm, Unexpected MEG Level (UMEGLVL) alarm, Unexpected Period (UPERIOD) alarm, alarm indication signal (AIS) message, and other suitable alarms. Also, as discussed above, in certain instances such transmitted alarms may be non-service affecting alarms that may issue despite no connectivity problems of a data path associated with the service to which the alarm is associated.

In operation, master control unit 103 and/or another component of network element 102 may be configured to detect the existence of non-service affecting alarms. In some embodiments, such determination may be made by analyzing one or more parameters relating to carrier traffic monitored by performance monitoring module 116. In response to detection of a non-service affecting alarm, master control unit 103 and/or another component of network element 102 may mask the non-service affecting alarm or downgrade the alarm from a service-affecting alarm to a non-service affecting state.

FIG. 3 illustrates a flow chart of an example method 300 for masking or downgrading service affecting alarms, in accordance with certain embodiments of the present disclosure. According to some embodiments, method 300 may begin at step 302. As noted above, teachings of the present disclosure may be implemented in a variety of configurations of network 10. As such, the preferred initialization point for method 300 and the order of the steps 302-312 comprising method 300 may depend on the implementation chosen.

At step 302, a maintenance end point 112 or another component of network element 102 may detect an alarm-triggering event associated with a service. Such event may be any event that may cause a maintenance end point 112 to trigger an alarm, including without limitation the types of alarms disclosed above. For example, an alarm-triggering event may be a lack of reception of CCM messages over a period of time from a peer maintenance end point.

At step 304, the maintenance end point 112, master control unit 103, and/or another component of network element 102 may initiate a timer for the alarm. Such timer may provide an interval in which parameters monitored by performance monitoring module 116 for the service may be analyzed. For example, in response to a lack of reception of CCM messages over a period of time from a peer maintenance end point, the maintenance end point 112, master control unit 103, and/or another component of network element 102 may initiate a timer for a LOC alarm.

At step 306, master control unit 103 and/or another component of network element 102 may, during the duration of the alarm timer, analyze one or more parameters for the service monitored by performance monitoring module 116. For example, master control unit 103 analyze the number of flow point packets (in FpPackets) received/transmitted for the service, the number of flow point bytes (in FpBytes) received/transmitted for the service, total frames received (TFR) for the service, and/or any other parameter indicative of communication of carrier traffic for the service to and/or from network element 102. In certain embodiments, it may be critical that master control unit 103 analyze only parameters associated with carrier traffic related to the service and MEP level associated with the alarm. Accordingly, parameters associated with management traffic (e.g., CCMs) from any MEP level may be ignored in the analysis.

At step 308, master control unit 103 and/or another component of network element 102 may determine whether analysis of the one of more parameters indicates whether a data path for the service is operational. For example, in certain embodiments, one or more parameters may indicate that a data path for the service is operational if none of such parameters indicate an error and/or one or more of such parameters indicate that a minimum performance level (e.g., minimum number of total frames received) has been sustained for the service during the alarm timer duration. If it is determined that the data path is operational (thus indicating that the alarm is a non-service affecting alarm), method 300 may proceed to step 310. Otherwise, if it is determined that the data path is not operational (thus indicating that the alarm is a service-affecting alarm), method 300 may proceed to step 312.

At step 310, in response to a determination that the data path for the service is operational, master control unit 103 and/or another component of network element 102 may mask the alarm or downgrading the alarm to a non-service affecting state and communicate the existence of the non-service affecting state. After completion of step 310, method 300 may end.

At step 312, in response to a determination that the data path for the service is not operational, master control unit 103 and/or another component of network element 102 may communicate the alarm as a service-affecting alarm (e.g., may display the alarm to an administrator of network 10). After completion of step 312, method 300 may end.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using network 10 or any other system operable to implement method 300. In certain embodiments, method 300 may be implemented partially or fully in software and/or firmware embodied in memory.

In certain embodiments, performance monitoring module 116 may continue to monitor parameters (e.g., traffic) associated with an alarm after an alarm has been reported, masked, and/or downgraded. Based on analysis of such parameters, a status of an alarm may be modified (e.g., masking or downgrading of an alarm may cease if traffic for the service associated with the alarm ceases or drops below a particular threshold).

A component of network 10 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), application specific integrated circuit (ASIC), field-programmable gate array (FPGA), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to network 10 without departing from the scope of the disclosure. The components of network 10 may be integrated or separated. Moreover, the operations of network 10 may be performed by more, fewer, or other components. Additionally, operations of network 10 may be performed using any suitable logic. As used in this document, "each" refers to each member of a set or each member of a subset of a set.

Certain embodiments of the disclosure may provide one or more technical advantages. A technical advantage of some embodiments may be that alarms in a communication system may be masked or downgraded from service-affecting alarms to non-service affecting alarms.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
   detecting by a maintenance end point the existence of an alarm-triggering event associated with a service at a maintenance level;
   analyzing one or more parameters associated with carrier traffic for the service;
   based on the analysis of the one or more parameters, determining whether a data path for carrier traffic associated with the service is operational; and
   masking or downgrading an alarm triggered by the alarm-triggering event in response to a determination that the data path is operational, wherein determining whether a data path for carrier traffic associated with the service is operational includes determining whether the one or more parameters indicate that a minimum performance level has been sustained for the service during a period of time associated with the alarm.

2. A method according to claim 1, wherein the one or more parameters include at least one of a number of flow point packets received or transmitted for a service, a number of flow point bytes received or transmitted for a service, and total frames received for a service.

3. A method according to claim 1, wherein the alarm includes one of a Loss of Continuity (LOC) alarm, Mismerge alarm, Unexpected MEP (UMEP) alarm, Unexpected MEG Level (UMEGLVL) alarm, Unexpected Period (UPERIOD) alarm, and alarm indication signal (AIS) message.

4. A method according to claim 1, wherein the alarm is an alarm in accordance with at least one of IEEE 802.1ag and ITU Y.1731.

5. A method according to claim 1, wherein the alarm-triggering event is a failure to receive a continuity fault management message at a maintenance end point from a peer maintenance end point.

6. A method according to claim 1, wherein determining whether a data path for carrier traffic associated with the service is operational further includes determining whether the one or more parameters indicate an error.

7. A method according to claim 1, wherein the period of time is determined by an alarm timer duration associated with the alarm.

8. A network element comprising:
   a maintenance end point configured to detect existence of an alarm-triggering event associated with a service at a maintenance level; and
   a master control unit configured to:
      analyze one or more parameters associated with carrier traffic for the service;
      based on the analysis of the one or more parameters, determine whether a data path for carrier traffic associated with the service is operational; and
      mask or downgrade an alarm triggered by the alarm-triggering event in response to a determination that the data path is operational, wherein determining whether a data path for carrier traffic associated with the service is operational includes determining whether the one or more parameters indicate that a minimum performance level has been sustained for the service during a period of time associated with the alarm.

9. A network element according to claim 8, wherein the one or more parameters include at least one of a number of flow point packets received or transmitted for a service, a number of flow point bytes received or transmitted for a service, and total frames received for a service.

10. A network element according to claim 8, wherein the alarm includes one of a Loss of Continuity (LOC) alarm, Mismerge alarm, Unexpected MEP (UMEP) alarm, Unexpected MEG Level (UMEGLVL) alarm, Unexpected Period (UPERIOD) alarm, and alarm indication signal (AIS) message.

11. A network element according to claim 8, wherein the maintenance end point is a Maintenance Entity Group End Point in accordance with at least one of IEEE 802.1ag and ITU Y.1731.

12. A network element according to claim 8, wherein the alarm-triggering event is a failure to receive a continuity fault management message at the maintenance end point from a peer maintenance end point of the maintenance end point.

13. A network element according to claim 8, the master control unit further configured to determine whether the one or more parameters indicate an error in order to determine whether a data path for carrier traffic associated with the service is operational.

14. A network element according to claim 8, wherein the period of time is determined by an alarm timer duration associated with the alarm.

15. A non-transitory computer-readable medium comprising instructions capable, when executed by a processor, to:
   detect at a maintenance end point the existence of an alarm-triggering event associated with a service at a maintenance level;
   analyze one or more parameters associated with carrier traffic for the service;
   determine whether a data path for carrier traffic associated with the service is operational based on the analysis of the one or more parameters; and
   mask or downgrade an alarm triggered by the alarm-triggering event in response to a determination that the data path is operational, wherein determining whether a data path for carrier traffic associated with the service is operational includes determining whether the one or more parameters indicate that a minimum performance level has been sustained for the service during a period of time associated with the alarm.

16. A non-transitory computer-readable medium according to claim 15, wherein the one or more parameters include at least one of a number of flow point packets received or transmitted for a service, a number of flow point bytes received or transmitted for a service, and total frames received for a service.

17. A non-transitory computer-readable medium according to claim 15, wherein the alarm includes one of a Loss of Continuity (LOC) alarm, Mismerge alarm, Unexpected MEP (UMEP) alarm, Unexpected MEG Level (UMEGLVL) alarm, Unexpected Period (UPERIOD) alarm, and alarm indication signal (AIS) message.

18. A non-transitory computer-readable medium according to claim 15, wherein the alarm is an alarm in accordance with at least one of IEEE 802.1ag and ITU Y.1731.

19. A non-transitory computer-readable medium according to claim 15, wherein the alarm-triggering event is a failure to receive a continuity fault management message at a maintenance end point from a peer maintenance end point.

20. A non-transitory computer-readable medium according to claim 15, wherein
   the period of time is determined by an alarm timer duration associated with the alarm.

* * * * *